(12) United States Patent
Houze et al.

(10) Patent No.: US 8,425,677 B2
(45) Date of Patent: Apr. 23, 2013

(54) AQUEOUS ADHESIVE COMPOSITION CONTAINING A MIXTURE BASED ON LEGUME STARCH

(75) Inventors: Régis Houze, Tourmignies (FR); Thierry Leroy, Lestrem (FR); Hervé Gombert, Hinges (FR); Pascal Corriette, Robecq (FR)

(73) Assignee: Roquette Freres, Lestrem (FR)

( * ) Notice: Subject to any disclaimer, the term of this patent is extended or adjusted under 35 U.S.C. 154(b) by 1324 days.

(21) Appl. No.: 11/337,604

(22) Filed: Jan. 24, 2006

(65) Prior Publication Data
US 2006/0180286 A1 Aug. 17, 2006

(30) Foreign Application Priority Data
Feb. 7, 2005 (FR) ...................... 05 01215

(51) Int. Cl.
| B32B 3/28 | (2006.01) |
| B32B 9/02 | (2006.01) |
| B32B 9/06 | (2006.01) |
| B32B 29/08 | (2006.01) |
| B32B 37/12 | (2006.01) |
| B32B 38/16 | (2006.01) |
| C09J 103/00 | (2006.01) |

(52) U.S. Cl.
USPC ........ 106/206.1; 428/182; 156/210; 156/290; 156/291; 156/292; 156/325; 106/211.1

(58) Field of Classification Search .................. 106/211, 106/206
See application file for complete search history.

(56) References Cited

U.S. PATENT DOCUMENTS

| 3,444,109 | A | * | 5/1969 | Golick et al. ................. 527/205 |
| 3,775,145 | A | * | 11/1973 | Ware et al. ................. 106/128.1 |
| 4,359,341 | A | * | 11/1982 | Allen ......................... 106/211.1 |
| 4,942,191 | A | * | 7/1990 | Rogers ........................... 524/17 |
| 5,286,769 | A |   | 2/1994 | Eden et al. |
| 5,393,336 | A | * | 2/1995 | Foran et al. ................ 106/208.1 |
| 5,405,437 | A | * | 4/1995 | Leake et al. ................ 106/217.9 |
| 5,454,898 | A | * | 10/1995 | Krankkala ..................... 156/328 |
| 6,838,187 | B2 | * | 1/2005 | Figiel et al. ................... 428/532 |
| 6,964,703 | B2 | * | 11/2005 | Geeroms .................... 106/211.1 |
| 7,591,892 | B2 | * | 9/2009 | Gombert et al. ........... 106/206.1 |
| 2006/0113028 | A1 | * | 6/2006 | Gombert ...................... 156/210 |
| 2006/0128840 | A1 | * | 6/2006 | Graux et al. .................... 524/47 |

FOREIGN PATENT DOCUMENTS

| EP | 0 038 627 | 10/1981 |
| EP | 0 229 741 | 7/1987 |
| EP | 1 352 939 | 10/2003 |
| FR | 2 846 662 | 5/2004 |
| JP | 02281090 A | * 11/1990 |
| JP | 2001164214 A | * 6/2001 |
| JP | 2002226810 A | * 8/2002 |
| WO | WO 2004/044082 | * 5/2004 |
| WO | WO 2004074380 A1 | * 9/2004 |

OTHER PUBLICATIONS

Eng Abstract of JP 02281090 A, Nov. 1990.*
English Abstract for JP 2001164214 A, Jun. 2001.*
English Abstract for JP 2002226810 A, Aug. 2002.*

* cited by examiner

*Primary Examiner* — David Sample
*Assistant Examiner* — Jeff Vonch
(74) *Attorney, Agent, or Firm* — Young & Thompson

(57) ABSTRACT

An aqueous adhesive composition intended for assembly of corrugated cardboard, consisting of a primary part and a secondary part, wherein the secondary part is made from a mixture including at least one legume starch and at least one cereal and/or tuber starch. A process for preparing corrugated cardboard using such a composition, and the corrugated cardboard thus obtained are also disclosed.

22 Claims, No Drawings

AQUEOUS ADHESIVE COMPOSITION CONTAINING A MIXTURE BASED ON LEGUME STARCH

The invention relates to an aqueous adhesive composition containing entirely or partially a mixture comprising at least one legume starch and at least one cereal and/or tuber starch, intended for assembly of corrugated cardboards.

More particularly, it relates to an aqueous adhesive composition having a primary part essentially constituted of gelatinized and/or swollen starch(es), and a secondary part essentially constituted of non-gelatinized and/or swollen starch(es).

More specifically, it relates to an aqueous adhesive composition intended for assembly of corrugated cardboard, whose secondary part is made from a mixture comprising at least one legume starch and at least one cereal and/or tuber starch.

In that case, the primary part may also be made from one single starch, in particular pea starch, but it may also be made from a mixture comprising at least one legume starch and at least one cereal and/or tuber starch, particularly from the same mixture used in the secondary part.

It also relates to a process for preparing corrugated cardboard using a composition according to the invention comprising a mixture, as defined in its secondary part and, optionally, in its primary part.

It also relates to the corrugated cardboard produced by the means according to the invention.

The invention relates to a mixture of at least one legume starch and at least one cereal and/or tuber starch, and its use to produce the secondary part and, optionally, to produce the primary part of a composition according to the invention.

The term "legume," as used in this invention, is more particularly understood to mean the Papilionaceae family, predominantly represented by beans, peas, lentils, broad beans, alfalfa, clover, and lupin.

The term "legume starch," as used in this invention, is understood to mean starches extracted from legume plants and, in particular, peas, which have a high starch content, greater than 90% (dry/dry), and a very low colloidal and fibrous residue content, of advantageously less than 1% (dry/dry).

The starch content is preferably greater than 95% and, even more preferably, greater than 98% (dry/dry).

At the same time, the protein content is of less than 1%, preferably less than 0.5%, and even more preferably, between 0.1 and 0.35% (dry/dry).

The term "aqueous adhesive composition," as used in this invention, is understood to mean any aqueous adhesive composition intended for producing corrugated cardboard, comprising a part of solubilized and/or swollen starch(es), which is called the base or primary part, presenting sufficient suspending properties, in particular with respect to granular starch, and a part of non-solubilized and/or only hydrated starch(es), i.e., in the state of insoluble granules and/or granules that are at least partially swollen, also called the secondary part.

Such compositions that make use, in the secondary part, of a starch in the state of insoluble granules are often produced according to principles known to a person skilled in the art as the "Stein-Hall process."

Per the rules inherent to this process and other similar processes, such as the so-called "Minocar" process (European patent EP 0 038 627), in a first step, at least one starch, water, and an alkaline agent are combined.

This mixture is heated, moderately in an open tank, or strongly with steam or using a continuous steamer, to achieve simple thickening or to obtain an alkaline colloidal solution having suitable characteristics, in particular rheologic characteristics, and a suitable ability to maintain in suspension particles that are insoluble and/or only hydrated.

This procedure constitutes a method for preparing the so-called "primary" or "base" part.

According to other rules for these processes, a dispersion combining at least water and one or more starches in a granular state is prepared at the water supply temperature. Most often, a boron derivative, commonly borax, is added to them. The resulting slurry forms the "secondary" part.

The primary and secondary parts are carefully mixed using various continuous or discontinuous methods.

According to a variant, it is possible to successively add water, granular starch(es), and, most often, borax to the primary part.

According to still another variant, it is possible to produce a ready-to-use product in the form of a dry commercial composition, i.e., one that contains no water other than the water contained in its components, for which a simple dispersion in water is sufficient to obtain a composition according to the invention.

Said pre-formulated composition comprises a pregelatinized starchy material derived from a legume starch, a tuber starch, a cereal starch, or a mixture thereof.

It also comprises a starchy material in the form of insoluble and/or swollen granules, capable of forming the secondary part, and which is produced from a mixture comprising at least one legume starch and at least one cereal and/or tuber starch.

It also comprises a mineral part which may generate the desired alkalinity in water. This may be for example a mixture of sodium carbonate and calcium hydroxide.

Finally, most of the time, it comprises a boron-containing agent, such as borax.

It is also understood that the pre-formulated composition may, for example, contain only the pregelatinized part and the granular and/or pre-swollen part. In that case, an alkaline agent and borax are added to the water or to the dispersion of the composition in water.

These processes result in aqueous adhesive compositions whose final solids content—an essential parameter—commonly varies between 20 and more than 30%.

An other process having a primary part comprising at least one solubilized starch, and a secondary part constituted of at least one starch in the form of granules, is known under the name "Pristim®" (European patent EP 0 229 741, in the name of the Applicant).

Within the framework of this process, the primary part is prepared by markedly increasing the temperature, without adding any alkaline agent.

However, in some cases, a very small amount of said alkaline agent is still added, in order to reduce and adjust the temperature required for gelatinization.

Regardless of the methods chosen to obtain the primary and secondary parts, technological advances in materials have often allowed persons skilled in the art to move towards aqueous adhesive compositions with high solids contents, most often produced from cereal and/or tuber starches.

Such an approach affords the advantage of decreasing the amount of water to be evaporated and to achieve a more favorable heat balance, but still seems insufficient.

Another solution consists of using modified or unmodified potato starch. However, at the solids content levels in question, solubilized or only swollen potato starch, whether modified or unmodified, does not have sufficient ability to maintain the starch granules of the secondary part in suspension, regardless of their nature, particularly when these consist of potato starch.

Based on this alone, it is imperative to provide, in the primary or base part, for the presence of a starchy material other than those derived from potato starch, such as for example a pea starch. The direct consequence of this aspect is the need, for such compositions, to supply at least two different starchy materials, which may constitute a major drawback to their use in current receiving and continuous preparation facilities.

Another possibility is afforded by compositions produced from legume starch. This is because, among the various sources of starchy materials, those constituted of legume starches, in particular pea starch, may be considered easily accessible under good conditions, in particular, good economic conditions.

The corresponding proposal, described in international patent application WO 2004/044082, filed in the name of the Applicant, as interesting as it may be, still does not provide entirely satisfactory answers to all of the high requirements presented by modern materials, particularly from the perspective of the energy required for gluing.

The addition of a legume starch and pea starch in particular is therein considered fundamental and essential for implementing compositions that may satisfy all requirements of modern materials, particularly in terms of ease of supply and use, as well as in terms of rheology and performance.

However, the invention, as described, possesses insufficiencies of varying degrees of severity, which in certain cases may even be unacceptable.

For example, while the stated advantages are undeniable, from a rheologic perspective in particular, when prepared using the "Stein-Hall" process, compositions produced with legume starch alone or with mixtures with a very high content in that starch cannot be suitable when prepared using the "Minocar" process.

In fact, the preparation method according to that process results in compositions with unacceptable, particularly short textures, which are totally impossible to use in a machine. The problem of unsuitable texture may be solved by markedly decreasing the concentration of the boron derivative, usually borax, which is very harmful to gluing properties.

Likewise, compositions produced using legume starch alone or mixtures with a very high content in that starch do not have all of the required guarantees, particularly in terms of stability, viscosity, and maintenance of texture when prepared according to the "Pristim" process.

However, it should be pointed out that a person skilled in the art tends to have even more demanding specifications and requirements, which said application does not satisfy.

In fact, above all, a person skilled in the art endeavors to find technically satisfactory solutions, regardless of the profile of his machine. His requirements are expressed in terms of machine speed, but also, above and beyond this, in terms of lower energy costs, from the point of view of both supplying it with cellulose material and of possibly preheating it for gluing micro-flutes and nano-flutes (e.g., G, N, O, or others), or heavy-duty cardboard.

From those standpoints, an increase in the solids of the composition or a decrease in the gelatinization point, if compatible with proper machine operation, related to absence of undesirable thickening of the glue, are only partial and insufficient solutions, especially when said composition essentially comprises pea starch in the primary and/or secondary part.

Its amylose content, in particular, may generate energy expenditures, for the supply of liners or their gluing, that a person skilled in the art finds unacceptable.

Furthermore, it has been reported in recent years, from a purely technical point of view, that the temperatures used for the machine's heating plates, which allow the gelatinization of the starch in the secondary part of the adhesive composition, are of paramount importance.

If too high, they cause problems with respect to gluing, which is exaggeratedly limited at the surface of the liner, and the cardboard then becomes brittle.

These findings led to considering a reduction in the heating capacity of such heating plates, which also satisfies the person skilled in the art's concern for reducing energy expenditures.

These considerations take on even greater importance since the heating profiles of certain machines art somewhat low, or even extremely low, and require new approaches to formulating the compositions that are used.

In fact, steam may be used, in some cases under low pressure, limited to no more than 2 bar, for example, or even very low pressure, with so-called cold plates.

Under such conditions, a person skilled in the art is even more demanding with respect to these heat aspects. At the same time, he naturally wishes to maintain the machine at optimal speed, thus meeting productivity and profitability criteria.

From that point of view, the teachings of international patient WO 2004/044082 do not answer all of these questions. They answer them even less when the composition used in the machine is at a lower temperature.

In particular, the relatively high amylose content of pea starch is, in many cases, likely to constitute a handicap in many cases, inasmuch as it may result in exaggerated and even unacceptable energy requirements.

This aspect is likely to be all the more marked if the cardboard is heavy and comprises a large number of gluing areas remotely located from the machine plates due to the geometry of the cardboard produced.

All of the aforesaid constraints lead to an understanding that new improvements are necessary and that there is a real need to continue to pursue and to further control the conditions of using legume starches.

Thus there is merit in the fact that the Applicant has observed, after numerous studies on the bases for using legume starches, and pea starch in particular, that there were particular solutions presenting great advantages for producing glue joints in the best-performing and most elaborate materials, particularly in a context of economical production of heavy-duty cardboard and gluing of micro-flutes.

In fact, the Applicant has found that binary mixtures of legume starch, particularly pea starches, and tuber starch, including potato or tapioca starch, are entirely advantageous, particularly strictly from the perspective of energy requirements and/or the temperature required at the beginning of gelatinization of said mixture, but also, of course, in the context of meeting all other criteria required by a person skilled in the art for simplicity with respect to the number of materials used, cost, supply, and performance.

Likewise, certain other binary mixtures of legume starches, in particular pea starch, and cereal starches, including corn or wheat starch, also have an undeniable advantage in terms of energy expenditure, fully compatible with all of the other requirements.

The result of these findings is that mixtures, qualified as "ternary," comprising both legume starch(es), a tuber starch(es), and cereal starch(es), have similar advantages.

These aspects are surprising and unexpected inasmuch as, taken separately, legume, tuber, and cereal starches do not have such advantages.

In other words, the present invention relates to an aqueous adhesive composition intended for gluing corrugated cardboard, comprising so-called primary and secondary parts, characterized in that the secondary part, constituted of non-gelatinized starches and/or swollen starches, essentially comprises a mixture of legume starch(es) and cereal and/or tuber starch(es), such that the ratio of legume starch to cereal and/or tuber starch is between 30:70 and 90:10, preferably between 40:60 and 80:20, and still preferably between 45:55 and 75:25.

According to one particular variant, the present invention relates to an aqueous adhesive composition additionally characterized in that the primary part, constituted of gelatinized and/or swollen starches, also essentially comprises a mixture of legume starch(es) and cereal and/or tuber starch(es), such that the ratio of legume starch to cereal and/or tuber starch is between 30:70 and 90:10, preferably between 40:60 and 80:20, and still preferably between 45:55 and 75:25.

The present invention also relates in particular to any process for producing a composition with a primary part, as explained above, of the "Stein-Hall," "Minocar," or "Pristim" type, or any product in the form of a dry commercial composition.

The Applicant also stresses the fact that the very concept of mixtures makes it possible to use any appropriate means, including continuous or discontinuous powder mixers, dry-phase thermal reactors ("Vomm" mixers) or slurry phase thermal reactors (e.g., so-called "annealing" technique), or thermomechanical reactors (e.g., "single-screw" or "double-screw" extruders).

The mixing possibilities, which also constitute so many minimal cost transformation possibilities, since they are performed in a single step, may be used both for the starchy material of the primary part and for the secondary part.

They may lead to the use of starches having a majority of swollen granules, sensitive to alkaline action, in the primary part as well as in the secondary part.

Thus, the invention does not preclude the borderline case where the starch in the primary part and the starch in the secondary part are in similar physical states, in particular in similar states of swelling and steric size, especially in an alkaline medium.

Compositions formulated according to the indicated ratios, based on the diversity of machines and of design and operation of the machines, will make it possible to preserve the advantages provided by the pea starch, without the drawback of the high amylose content.

The use of identical mixtures in the primary part and secondary part also have a fundamental advantage in that a single raw material need be supplied.

It should also be pointed out that, in view of the advantages of potato starch in terms of energy, and as described above, relative to solubilized or swollen potato starch's lack of capacity for suspending, especially starch granules, it may be helpful, when designing the primary part, to consider a mixture of potato starch and pea starch, whose proportions would be based on the sole criterion of capacity for suspending, leading to the possible incorporation of a smaller quantity of legume starch, i.e., pea starch, than recommended in the above mixtures.

Other considerations confirm the advantage of the presence of potato starch in the secondary part. For the supply of liners and in cases where they are preheated, this provides low water retention, improving the wettability of the liners, and a low gelatinization point, allowing good gluing with less preheating.

Thus, ratios of potato starch to pea starch between 45:55 and 70:30 may be advantageous from these points of view, whether in the primary and/or secondary part.

Even above and beyond this, such choices of higher proportions of potato starch in the primary part are justified by better stability of the preparations.

In any event, more specifically, said aqueous adhesive compositions are characterized in that the legume starch, and pea starch in particular, have:
- a starch content greater than 90% (dry/dry), preferably greater than 95%, and, even more preferably, greater than 98%
- a colloidal and fibrous residue content of less than 1% (dry/dry)
- a protein content of less than 1%, preferably less than 0.5%, and even more preferably, between 0.1 and 0.35% (dry/dry)

The invention more specifically relates to a composition characterized in that the legume starch, and pea starch in particular, has an amylose content of between 15 and 60%, preferably between 20 and 55%, and, even more preferably, between 30 and 52%.

The composition according to the invention is advantageously characterized in that it comprises between 10 and 40%, by weight, of the mixture relative to the totality of said composition.

The advantage of these characteristics increases with the difficulty of the production.

In fact, in general, the manufacture of so-called "single face" (SF) or "double face" (DF) cardboard is much less difficult than "double double" (DD) or "triple-fluted," even quadruple-fluted corrugated cardboard, or cardboard with more fluting, micro-fluting, nano-fluting, and/or heavy-duty cardboard.

It is also to the credit of the Applicant to propose a process for preparing corrugated cardboard suitable for such compositions, characterized in that it comprises, at least once, the steps consisting of distributing the adhesive composition according to the invention on the tips of the flutes of a preformed strip of paper, applying a liner or flat cardboard to the tips of such coated flutes, and then drying them.

Thus, using compositions according to the invention and appropriate means, it is possible and easy to manufacture corrugated cardboard that satisfies the technical requirements, including for preparation of heavy-duty cardboard, with multiple flutes and/or micro-flutes.

Mixtures according to the invention constitute, as desired, a simple means, particularly by using the possibility of using an identical material for the primary and secondary parts, since it is inexpensive, easily supplied, particularly compared to tuber starches, not highly regulated, and is performant in suitable formulations when said mixtures are prepared according to the recommended ratios.

Thus, a starch mixture according to the invention, essentially for the secondary part and possibly for the primary part of the adhesive composition, has a very positive effect on all of the criteria specified above, i.e., improving all operating parameters as well as all characteristics useful for corrugated cardboard and, in particular, improving "tack," so-called "green" gluing, glue setup speed, and gluing quality, while greatly reducing the energy expenditures necessary to achieve the desired results.

From the latter standpoint, it is important to point out that compositions according to the invention are suited to and compatible with the advent of lower heating profiles in certain machines, including those that use steam under reduced pressure, for example of no more than 2 bar, or even so-called cold plates.

Somewhat differently, it was found that, with more conventional machines, it was possible and even desirable to markedly reduce the number and/or the temperature of heating plates.

Furthermore, it has been found that the advantages hold true and are even more advantageous when the composition is brought to a relatively low temperature.

Furthermore, the Applicant considers that, in preparing adhesive compositions according to the invention, it may be entirely sufficient to use mixtures of legume, tuber, and/or cereal starches that are not chemically or otherwise modified.

However, it is clear that simultaneously or separately modified starches, including etherified or esterified starches, are even better suited and fall within the scope of the invention.

Use of these materials, which normally have a higher cost, may still be justified due to the rheologic properties and the stability of the glues, for "green" gluing, glue setup and gluing quality, as well as strength compared to the characteristics obtained with unmodified starches.

In particular, it is possible to use mixtures of starches that are modified or unmodified, partially oxidized or hydrolyzed by at least one acid or enzyme, to prepare compositions with high solids contents, in order to adjust their viscosity.

Another advantageous solution for preparing the primary part consists of preparing the base using a so-called "direct steam" cooking device, in particular in a continuous way.

Other modifications are possible, especially physical modifications, for example, thermomechanical operations such as pre-gelatinization on drying drums or extrusion, or thermal operations such as those known to persons skilled in the art as hot moisture treatment (HMT) or annealing.

Polymers, generally with high viscosities, known for such uses, such as cellulose derivatives, polyvinyl alcohols, polyvinyl acetates, or polyvinyl pyrrolidone, may also be added, in particular to the primary part.

Furthermore, when industrial constraints require that the glue joints obtained using compositions according to the invention be moisture- or water-resistant, cross-linking agents or preformed resins may be used.

In particular, compositions according to the invention more easily meet moisture- or water-resistance requirements without harming the environment, health, or safety conditions, when they contain a formaldehyde or non-formaldehyde resin and/or a judiciously chosen non-synthetic, non-formaldehyde water-resistance agent.

In particular, it has been found that, all other conditions being equal, the selected proportion of legume starch, and pea starch in particular, makes it possible to preserve the advantages provided by the legume starch from a moisture- or water-resistance perspective, when the amylose content of that starch is between 15 and 60%, preferably between 20 and 55%, and, even more preferably, between 30 and 52%.

It was also found that it is possible, under suitable conditions, to reduce the quantities of formaldehyde or non-formaldehyde resin and/or of non-synthetic, non-formaldehyde water-resistance agent.

More specifically, it was found that, with minimal impact on price, there were easily implementable means, consisting of using additional small quantities of water-resistance improving agents such as those selected, for example, from salts such as sulfates, for example zinc, copper, or alumina sulfate, diammonium phosphate, or a compound containing zirconium.

In particular, in an adhesive composition according to the invention, it is possible to combine resins that are commonly added to obtain suitable water resistance, such as various non-formaldehyde or formaldehyde resins, especially of the urea-formaldehyde type, ketone-formaldehyde type, resorcin-formaldehyde type, or phenol-formaldehyde type, generally with a bridging ability and/or an intrinsic hydrophobic character, and sulfates such as zinc or alumina.

According to one variant, an adhesive composition according to the invention that is satisfactory from this point of view is characterized in that it is free of formaldehyde resin or even synthetic resin and in that it comprises an effective amount of a chemical agent selected from sulfates such as zinc, alumina or copper sulfates, or compounds containing zirconium or diammonium phosphate.

The term "effective amount" is understood to mean a amount of resin or chemical agent at least equal to the amount enabling said adhesive composition to impart to the final corrugated cardboard water resistance characteristics that meet FEFCO test No. 9 criteria.

The various aspects of this invention relative to the formulation and preparation of usual adhesive compositions will be described in greater detail using the following non-limiting examples.

EXAMPLE 1

Two "Stein-Hall" adhesive compositions are prepared, one using only pea starch PS that is native, i.e., not modified, according to the teachings of document WO 2004/044082, and the other one differing from the first in that it comprises, in the secondary part, a mixture of native pea starch (PS) and native potato starch (POS) in a ratio of 80:20.

The pea starch has a starch content greater than 95%, a protein content of 0.30%, and a colloidal substance content of less than 1%.

The amylose content of said starch is 35.7%.

The two resultant compositions, useful for gluing so-called "Triple Flute" corrugated cardboard, are compared to a conventional formula using native corn starch CS in the primary part and native potato starch POS in the secondary part.

The essential parameters are as follows:

|  | Pea starch (PS) WO 2004/044082 | Pea starch (PS) + potato starch (POS) (invention) | Corn starch (CS)/potato starch (POS) |
|---|---|---|---|
| primary part: | | | |
| water | 370 ml | 370 ml | 370 ml |
| starch | PS: 35 g | PS: 33 g | CS: 42 g |
| heating | 32° C. | 32° C. | 32° C. |
| Pure soda/water | 6.3 g/10 ml | 6.2 g/10 ml | 4.6 g/10 ml |
| Stirring | 11 minutes | 11 minutes | 11 minutes |
| secondary part: | | | |
| water | 665 ml | 665 ml | 665 ml |
| starch | PS: 414.5 g | PS: 333 g POS: 83.5 g | POS: 407.5 g |
| borax | 3.08 g | 3.08 g | 2.08 g |
| Stirring | 12 minutes | 12 minutes | 12 minutes |
| Lory cup viscosity | 30 seconds | 21.5 seconds | 24.5 seconds |

-continued

|  | Pea starch (PS) WO 2004/044082 | Pea starch (PS) + potato starch (POS) (invention) | Corn starch (CS)/potato starch (POS) |
|---|---|---|---|
| Brookfield viscosity | 480 mPa · s | 430 mPa · s | 550 mPa · s |
| Refractive index | 4.3 | 4.1 | 4.3 |

In the laboratory, a so-called "double face" gluing is performed:

|  | Gelatinization pt. - secondary part after assembly | | |
|---|---|---|---|
|  | 45° C. | 46° C. | 48.5° C. |
| Green gluing - 95° C. with Strohlein device | | | |
| open time O.T. 0 | 17.5 sec. | 16 sec. | 12.9 sec. |
| open time O.T. 5 | 12 sec. | 12.9 sec. | 11 sec. |

We also note that, in compositions prepared and maintained at low temperatures, 32° C. in this case, the teachings of the prior art presented in international patent application WO 2004/044082 do not show an advantage, in the laboratory, of using pea starch in general, nor even of using a mixture of 80% pea starch/20% potato starch in the secondary part.

Conversely, the possible machine-specific findings, especially in terms of machine speed and gluing quality, clearly indicate the advantage of pea starch and of mixtures of pea starch/potato starch, in the ratios recommended in the invention, for producing so-called "double double," "triple fluted," and "quadruple fluted" cardboard.

Above and beyond this, the limits of compositions of the prior art, whether prepared from corn starch and potato starch or pea starch alone, are all the more evident when there are reductions or variations in energy input, such as for example those elicited, by a decrease in the steam pressure powering the machine.

EXAMPLE 2

Now, in order to understand this phenomenon, we will proceed with a direct comparison on a machine, for the manufacture of so-called "triple fluted" cardboard, using two "Stein-Hall" compositions, both with native pea starch in the primary part and comprising respectively, in their secondary part, either native pea starch or a mixture according to the invention, comprising 70% native pea starch and 30% native potato starch.

We will proceed with a second, similar comparison, with a formula for gluing "double face" cardboard.

| Materials: primary secondary | Formula for triple fluting (TF) | Formula for double double (DD) cardboard |
|---|---|---|
| Primary part: water | 600 | 600 |
| Pea starch | 73 | 82 |
| Heating | 30° C. | 30° C. |
| Soda | 29 liters | 29 liters |
| Stirring | 15 minutes | 15 minutes |
| secondary: water | 1500 | 1575 |
| Borax (1$^{st}$ addition) | 7 | 6 |
| Starchy material | A: PS 775 | A: PS 655 |
|  | B: PS 542.5 + POS 232.5 | B: PS 458.5 + POS 196.5 |
| Borax (2$^{nd}$ addition) | 5 | 4 |
| Stirring | 15 minutes | 15 minutes |
| Total: water | 2100 | 2175 |
| Total starchy: | 848 | 737 |
| Overall dry solids | 28.8% | 26.5% |
| Lory cup viscosity | 30 seconds | 27 seconds |
| Gelatinization temperature | 48° C. | 49° C. |

In the case of use of "B" compositions comprising a mixture of pea starch and potato starch in a ratio of 70:30 in the secondary part, we find on the machine a very marked increase in machine speed compared to the "A" composition. It is increased by approximately 50%, at identical heating plate settings.

This gain in production represents a markedly lower need for thermal energy to achieve quality gluing of markedly lesser equality when B formulas according to the invention are used compared to A formulas.

Thus, the energy balance appears very favorable to the mixture of pea starch and potato starch.

We further note that A and B formulations have similar rheologic characteristics and that it is consequently possible to maintain the same glue deposit and film thickness.

EXAMPLE 3

We prepare two Stein-Hall adhesive compositions for gluing double double (DD) cardboard, both comprising native corn starch alone in the primary part.

The C formula comprises a mixture of native corn starch and native potato starch in the secondary part.

Comparatively, the D formula comprises a mixture of native corn starch and native pea starch in the secondary part.

| Materials: primary secondary | Formula C - secondary: corn starch - potato starch | Formula D - secondary: corn starch and pea starch |
|---|---|---|
| Primary part: water | 960 | 960 |
| Corn starch | 145 | 147 |
| Heating | 40° C. | 42° C. |
| Soda | 48 kg | 45 kg |
| Stirring | 15 minutes | 15 minutes |
| secondary: water | 1710 | 1710 |
| Borax (1$^{st}$ addition) | 6 | 6 |
| Starchy material | CS: 300 | CS: 330 (40%) |
|  | POS: 600 | PS: 500 (60%) |
| Borax (2$^{nd}$ addition) | 5 | 5 |
| Stirring | 18 minutes | 18 minutes |
| Total: water | 2670 | 2670 |
| Total dry starchy | 884 | 860 |
| Overall dry solids | 23.35% | 23.15% |
| Lory cup viscosity | 25 seconds | 25 seconds |
| Gelatinization temperature | 51° C. | 51° C. |

On the machine, at identical speeds and comparable gluing quality, we see that the use of formula D, comprising a mixture of native corn starch and native pea starch makes it possible to decrease the glue deposit and produce drier cardboard.

Here again, the energy balance is very favorable to the mixture according to the invention, comprising pea starch and, this time, corn starch.

EXAMPLE 4

We prepare two compositions, composition E according to the invention and composition F according to the prior art, comprising respectively, in the secondary part a mixture of native corn starch/native pea starch and a mixture of native corn starch/native potato starch.

Formula E also has a primary part composed of a mixture of native corn starch/native pea starch, with the latter constituting the majority, while formula F contains only native corn starch in the primary part.

Such compositions are useful for so-called single face (SF) gluing.

| Materials: primary secondary | Formula E - primary and secondary: CS/PS | Formula F - secondary: CS/POS |
|---|---|---|
| Primary part: water | 1200 | 1200 |
| Starchy material | PS: 100 (62.5%) | CS: 167 |
|  | CS: 60 (37.5%) |  |
| Heating | 40° C. | 33° C. |
| Soda | 52.5 kg | 48 kg |
| Stirring | 15 minutes | 15 minutes |
| secondary: water | 2100 | 2100 |
| Borax (1$^{st}$ addition) | 7.8 | 7.8 |
| Starchy material | CS: 650 (74%) | CS: 805 |
|  | PS: 230 (26%) | POS: 250 |
| Borax (2$^{nd}$ addition) | 5.4 | 5.4 |
| Stirring | 15 minutes | 15 minutes |
| Total: water | 3300 | 3300 |
| Total dry starchy | 915 | 1060 |
| Overall dry material | 20.7% | 23.1% |
| Lory cup viscosity | 18 seconds | 21 seconds |
| Gelatinization temperature | 52° C. | 52° C. |

Here too, the energy balance is favorable. We are expressing it differently, pointing out that, at the same production speed, the gluing quality is markedly better with composition E according to the invention, compared to formula F.

EXAMPLE 5

The two compositions E and F from example 4, are now used for gluing type G micro-fluting. To achieve satisfactory gluing with formulation F requires the use of all of the machine's heating tables, i.e., 20 tables supplied with steam at 14 bar. In comparison, formulation E makes it possible to very markedly modify the heating profile. In fact, it was possible to reduce to 5 bar the steam pressure for the first four and last six tables.

EXAMPLE 6

An industrial test was attempted in order to establish the comparative performances of pea starch alone, used in the primary and secondary parts versus a mixture of 50% pea starch and 50% potato starch, also used in both the primary part and the secondary part.

We chose to implement these two types of compositions using a test that is considered particularly probative, i.e., on two different, heavy types of so-called "double double" cardboard.

Using preparations with 33% solids content and a gelatinization point close to 48° C., we easily establish the superiority of the composition containing the mixture.

In fact, the increase in speed reaches 40 meters per minute. This benefit is attributed to the increased efficacy, of preheating the liners, if applicable, as well as to the faster gelatinization of the secondary part, when the mixture contains potato starch.

The three first examples illustrate the advantage, in a "Stein-Hall" preparation, of mixtures of pea starch, when used in the secondary part of the composition, regardless of whether they otherwise are of the "legume starch—tuber starch" type or "legume starch—cereal starch" type.

The next three examples involve compositions wherein the mixtures are present in both the primary part and the secondary part.

The compositions containing mixtures according to the invention have improved rheologic behaviors, gluing performances, and/or financial advantages compared to the prior art. The conclusion remains valid when we compare them to compositions containing pea starch alone in the primary and/or secondary part.

EXAMPLE 7

We prepare a "Minocar" adhesive composition using native pea starch PS alone, according to the teachings of document WO 2004/044082.

The pea starch is the one from example 1, with a starch content of greater than 95%, a protein content of 0.30%, and a colloidal substance content of less than 1%. The amylose content is 35.7%.

According to the principle of this method, in the laboratory, contrary to the "Stein-Hall" process wherein the primary starch is carefully gelatinized, we proceed with an only partial and controlled swelling, in water, of a relatively large quantity of starch, which will constitute the primary part or base.

The elements for preparation of the primary part of the composition are as follows:

| Primary: | |
|---|---|
| Water | 765 |
| Pea starch | 143 |
| Temperature | 33° C. |
| Soda/water (g/g), introduced in 5 minutes | 4.9/10 |

The product is stirred at 1750 rpm. The reaction is stopped after 9 minutes by adding water intended for the secondary part.

| secondary: | |
|---|---|
| Water | 209 |
| Pea starch | 285 |
| Water | 79 |
| borax | 4.0 |

The preparation, now complete, is stirred for 15 minutes at 1750 rpm.

We then take conventional viscosity measurements, i.e., Lory cup and Brookfield viscosities.

The results are 19.5 seconds and 2425 mPa·s, respectively, representing a composition with a very short texture. From this finding alone, we can deduce that it is entirely unsuited for the application.

This noncompliance may be expressed by a B/L (Brookfield/Lory cup viscosity) ratio of 124, which is very remote from the standards used by the Applicant, which are approximately in the 40-50 range.

EXAMPLE 8

We then compare compositions that contain, in the primary part and the secondary part, respectively:
 pea starch alone (formula M1)
 a mixture of 75% pea starch—25% potato starch (formula M2)
 a mixture of 50% pea starch—50% potato starch (formula M3)
These three formulations result in compositions with the following characteristics:

|  | M1 | M2 | M3 |
|---|---|---|---|
| Primary: |  |  |  |
| Water | 765 | 765 | 765 |
| Pea starch | 143 | 107.25 | 71.5 |
| Potato starch | 0 | 35.75 | 71.5 |
| Temperature | 33° C. | 33° C. | 33° C. |
| Soda/water (g/g) | 5.1/10 | 5.1/10 | 4.9/10 |
| Stirring speed (rpm) | 800 | 800 | 800 |
| Reaction time (minutes)- | 10.5 | 9 | 7 |

To stop the reaction, we add the secondary part water while stirring vigorously (1750 rpm).

|  | M1 | M2 | M3 |
|---|---|---|---|
| secondary: |  |  |  |
| Water | 209 | 209 | 209 |
| Pea starch | 285 | 213.75 | 142.5 |
| Potato starch | 0 | 71.25 | 142.5 |
| Water | 79 | 79 | 79 |
| Borax | 4 | 4 | 4 |

We continue stirring for 15 minutes. The viscosities and B/L ratio are as follows:

|  | M1 | M2 | M3 |
|---|---|---|---|
| Lory cup viscosity (seconds) | 16.5 | 18 | 19 |
| Brookfield viscosity (mPa · s) | 2550 | 990 | 700 |
| B/L ratio | 154.5 | 55 | 37 |
| Gelatinization point | 45° C. | 46° C. | 46° C. |

While this confirms that the texture of the "Minocar" composition, with pea starch alone, is unsuitable, 25% potato starch is sufficient to reestablish a suitable B/L ratio.

Above and beyond this—and this is particularly true for the 50:50 mixture—compositions according to the invention enable better liner wetting, particularly when the supply to the machine is preheated. The glue setup speed is then improved.

Still more particularly, like the Stein-Hall compositions, such formulations markedly reduce energy expenditure, while allowing increased machine speed.

EXAMPLE 9

We prepare two "Pristim" compositions, P1 and P2, wherein the primary part is produced by thermal action, with no alkaline agent.

P1 is obtained from only the native pea starch from example 1, and P2 contains, in the primary and secondary parts, a mixture of 50% pea starch and 50% potato starch.

|  | P1 (prior art) | P2 (according to the invention) |
|---|---|---|
| Primary: Water at 50° C. | 618 | 618 |
| Starchy material | 73 | 80 |
| $1^{st}$ heating, stirring at 2000 rpm | 66° C. - 2 min. | 64° C. - 2 min. |
| $2^{nd}$ heating stirring at 2000 rpm | 72° C. - 20 min. | 70° C. - 20 min. |
| secondary: water | 1103 | 1103 |
| Borax | 3 | 3 |
| Starchy material | 742 | 735 |
| Soda/water | 2.5/221 | 3.5/221 |
| Borax | 3 | 3 |
| Stirring at 2000 rpm | 10 min. | 10 min. |

At this stage of the sole preparation, we note that the temperatures required for gelatinization are already, with P1, relatively low, compared to those that must be achieved with the other starchy materials, particularly with cereal, corn, or wheat starches.

With P2 and the addition of potato starch to the mixture, the gelatinization temperature is even lower, by 2° C. or more.

On an industrial scale, these preparation conditions allow storage at a sufficiently low temperature (about 35° C.) that it is not necessary to provide a mechanism for maintaining the temperature, such as for example insulating the tank.

The viscosity characteristics, by flow (Lory cup) and shearing (Brookfield), and the B/L ratio are:

|  | P1 | P2 |
|---|---|---|
| Lory cup viscosity (seconds) | 15 | 17 |
| Brookfield viscosity (mPa · s) | 690 | 590 |
| B/L ratio | 46 | 35 |

These data show that the behavior of the freshly prepared compositions will be satisfactory.

However, above and beyond this, compositions P1 and P2 underwent an aging test while stored for 24 hours at room temperature, and were then subjected to shear at 2000 rpm, in order to simulate machine conditions and observe their reactivity when reused after shutdown and/or a storage period.

|  | P1 | P2 |
|---|---|---|
| 5 minutes at 2000 rpm |  |  |
| Lory cup viscosity (seconds) | Measurement Impossible | 46 |
| Brookfield viscosity (mPa · s) | 4500 | 1020 |
| $B/L_5$ ratio | — | 22 |
| 10 minutes at 2000 rpm |  |  |
| Lory cup viscosity (seconds) | >60 | 27.5 |
| Brookfield viscosity (mPa · s) | 3900 | 910 |
| $B/L_{10}$ ratio | — | 33 |
| 15 minutes at 2000 rpm |  |  |
| Lory cup viscosity (seconds) | 41 | 20 |
| Brookfield viscosity (mPa · s) | 2850 | 780 |
| $B/L_{15}$ ratio | 69.5 | 39 |

These aging and reuse tests on the preparations show that the composition according to the invention is better suited than the composition containing pea starch alone.

The invention claimed is:

1. An aqueous adhesive composition intended for gluing corrugated cardboard, comprising:
    primary and secondary parts,
    the primary part consisting of gelatinized starches and/or swollen starches, said gelatinized starches and/or swollen starches being a mixture of legume starches and cereal and/or tuber starches, such that the weight ratio of legume starch to cereal and/or tuber starch is between 30:70 and 90:10, and
    the secondary part consisting of non-gelatinized starches, said non-gelatinized starches being a mixture of legume starches and cereal and/or tuber starches, such that the weight ratio of legume starch to cereal and/or tuber starch is between 30:70 and 90:10, wherein the legume starch of the secondary part has a protein content of less than 1% (dry/dry); and
    0.3 to 5%, by weight, of an alkaline substance relative to the totality of said composition,
    wherein the composition is free of formaldehyde resin and synthetic resin.

2. The composition according to claim 1, wherein the weight ratio of legume starch to cereal and/or tuber starch in the secondary part is between 40:60 and 80:20.

3. The composition according to claim 1, wherein the weight ratio of legume starch to cereal and/or tuber starch in the secondary part is between 45:55 and 75:25.

4. The composition according to claim 1, wherein the weight ratio of legume starch to cereal and/or tuber starch in the primary part is between 40:60 and 80:20.

5. The composition according to claim 1, wherein the weight ratio of legume starch to cereal and/or tuber starch in the primary part is between 45:55 and 75:25.

6. The composition according to claim 1, wherein the legume starch of the secondary part has:
    a starch content greater than 90% (dry/dry), and
    a colloidal and fibrous residue content of less than 1% (dry/dry).

7. The composition according to claim 6, wherein the legume starch of the secondary part has a protein content of less than 0.5% (dry/dry).

8. The composition according to claim 6, wherein the legume starch of the secondary part has a protein content of between 0.1 and 0.35% (dry/dry).

9. The composition according to claim 6, wherein the legume starch of the secondary part has a starch content greater than 95% (dry/dry).

10. The composition according to claim 6, wherein the legume starch of the secondary part has a starch content greater than 98% (dry/dry).

11. The composition according to claim 1, wherein the legume starch of the secondary part has an amylose content of between 15 and 60%.

12. The composition according to claim 11, wherein the legume starch of the secondary part has an amylose content of between 20 and 55%.

13. The composition according to claim 11, wherein the legume starch of the secondary part has an amylose content of between 30 and 52%.

14. The composition according to claim 1, wherein the composition comprises between 10 and 40%, by weight, of the mixture of the secondary part relative to the totality of said composition.

15. The composition according to claim 1, wherein the mixture of legume starches and cereal and/or tuber starches of the secondary part is a mixture of legume starches and of potatoes starch.

16. The composition according to claim 1, wherein the legume starch of the secondary part is pea starch.

17. The composition according to claim 1, wherein the composition contains no water other than the water contained in its components.

18. The composition according to claim 1, further comprising:
    0.01 to 5%, by weight, relative to the total starch, of borax or any other chemical compound containing boron.

19. A process for preparing corrugated cardboard, characterized in that it comprises at least once the following steps:
    applying to the tips of the flutes of a preformed strip of paper, a composition according to claim 1,
    applying a liner or flat cardboard to the tips of the flutes coated with the composition, and
    drying.

20. A corrugated cardboard comprising an aqueous adhesive composition intended for gluing corrugated cardboard, comprising:
    primary and secondary parts,
    the primary part consisting of gelatinized starches and/or swollen starches, said gelatinized starches and/or swollen starches being a mixture of legume starches and cereal and/or tuber starches, such that the weight ratio of legume starch to cereal and/or tuber starch is between 30:70 and 90:10, and
    the secondary part consisting of non-gelatinized starches, said non-gelatinized starches being a mixture of legume starches and cereal and/or tuber starches, such that the weight ratio of legume starch to cereal and/or tuber starch is between 30:70 and 90:10, wherein the legume starch of the secondary part has a protein content of less than 1% (dry/dry); and
    0.3 to 5%, by weight, of an alkaline substance relative to the totality of said composition,
    wherein the composition is free of formaldehyde resin and synthetic resin.

21. The corrugated cardboard according to claim 20, wherein the corrugated cardboard is water-resistant according to FEFCO test No. 9 criteria.

22. A method of gluing corrugated cardboard, which comprises using an effective amount of a composition according to claim 1.

* * * * *